(12) United States Patent
Elangovan et al.

(10) Patent No.: US 12,222,266 B2
(45) Date of Patent: Feb. 11, 2025

(54) SEED SLICER DEVICE

(71) Applicant: ADVANTA ENTERPRISES LIMITED, Mumbai (IN)

(72) Inventors: Mani Elangovan, Hyderabad (IN); Vinod Madurai Sathyanarayana, Bryan, TX (US)

(73) Assignee: ADVANTA ENTERPRISES LIMITED, Mumbai (IN)

( * ) Notice: Subject to any disclaimer, the term of this patent is extended or adjusted under 35 U.S.C. 154(b) by 328 days.

(21) Appl. No.: 17/634,144

(22) PCT Filed: Aug. 21, 2020

(86) PCT No.: PCT/IB2020/057859
§ 371 (c)(1),
(2) Date: Feb. 9, 2022

(87) PCT Pub. No.: WO2021/038402
PCT Pub. Date: Mar. 4, 2021

(65) Prior Publication Data
US 2022/0268667 A1 Aug. 25, 2022

(30) Foreign Application Priority Data
Aug. 27, 2019 (IN) .............................. 201921034553

(51) Int. Cl.
*G01N 1/06* (2006.01)
*A01C 1/02* (2006.01)
(Continued)

(52) U.S. Cl.
CPC .............. *G01N 1/06* (2013.01); *A01C 1/025* (2013.01); *A01C 1/04* (2013.01);
(Continued)

(58) Field of Classification Search
CPC ... B26D 3/30; B26D 7/01; B23Q 3/18; B23Q 3/183; B23Q 3/186; B26B 29/06;
(Continued)

(56) References Cited

U.S. PATENT DOCUMENTS 6,244,146 B1 * 6/2001 Arthur ................. A61J 7/0007
83/167
7,997,415 B2 * 8/2011 Mongan ................. B07C 5/344
198/690.1
(Continued)

FOREIGN PATENT DOCUMENTS

| JP | 2008118963 A | 5/2008 | |
| WO | WO-2012096568 A1 * | 7/2012 | ............... A01G 7/00 |
| WO | 2010108082 A1 | 9/2020 | |

OTHER PUBLICATIONS

International Search Report and Written Opinion for International Application PCT/IB/057859; International Filing Date: Aug. 21, 2020; Date of Mailing: Nov. 9, 2020; 10 pages.

*Primary Examiner* — Laura M Lee
(74) *Attorney, Agent, or Firm* — CANTOR COLBURN LLP

(57) ABSTRACT

A seed slicer device (100), which has: a first plate (102) provided with first holes (104); a second plate (106) provided with second holes (108), adapted to fit over the first plate; a sliding plate (110) slidably coupled to a top portion of the second plate, operable to cover the second holes; a third plate (112) provided with a third holes (114), adapted to fit over the second plate; and a cutting assembly (116) coupled to the third plate and adapted to slide over the third holes to provide a slicing action; the seeds are received by the third holes such that at least a first part of the seeds extend beyond the third holes, and, upon actuation of the
(Continued)

cutting assembly, the seeds are cut by the cutting means to divide the seeds into corresponding first parts and second parts.

14 Claims, 3 Drawing Sheets

(51) Int. Cl.
*A01C 1/04* (2006.01)
*B26D 3/30* (2006.01)

(52) U.S. Cl.
CPC .......... *A01C 2001/048* (2013.01); *B26D 3/30* (2013.01); *G01N 2001/061* (2013.01); *G01N 2001/063* (2013.01)

(58) Field of Classification Search
CPC .. B26B 29/063; A01C 2001/048; G01N 1/04; G01N 2001/061063; G01N 1/18
USPC ......... 83/870–872, 761, 762, 686, 932, 167, 83/157
See application file for complete search history.

(56) References Cited

U.S. PATENT DOCUMENTS

| | | | |
|---|---|---|---|
| 8,221,968 B2* | 7/2012 | Becker | G01N 1/286 435/4 |
| 8,286,387 B2* | 10/2012 | Becker | G01N 1/286 47/58.1 SE |
| 11,326,987 B2* | 5/2022 | Micic | A01G 9/028 |
| 2008/0113367 A1 | 5/2008 | Becker et al. | |
| 2010/0047912 A1 | 2/2010 | Mongan et al. | |
| 2015/0322443 A1* | 11/2015 | McCarty, II | C12N 15/8205 83/13 |
| 2017/0027102 A1* | 2/2017 | Fredericksen | B26D 3/14 |
| 2019/0195747 A1 | 6/2019 | Micic et al. | |

\* cited by examiner

SEED SLICER DEVICE

CROSS REFERENCE TO RELATED APPLICATIONS

This application is a National Stage application of PCT/IB2020/057859, filed Aug. 21, 2020, which claims the benefit of priority to Indian Patent Publication No. 201921034553, filed Aug. 27, 2019, both of which are incorporated by reference in their entirety herein.

TECHNICAL FIELD

The present disclosure relates to the field of seed sampling. More particularly, the present disclosure relates to a device for chipping or slicing a part of a seed for sampling purposes.

BACKGROUND

Background description includes information that may be useful in understanding the present invention. It is not an admission that any of the information provided herein is prior art or relevant to the presently claimed invention, or that any publication specifically or implicitly referenced is prior art.

Seed sampling is an important step in agricultural technology to sample seeds for further testing quality of seeds. Seed testing has been developed to aid agriculture to avoid some of the hazards of crop production by furnishing the needed information about different quality attributes viz., purity, moisture, germination, vigour, and health of the seed.

The samples of seeds received for testing are required to be reduced to obtain working samples for carrying out various tests on them. This helps in determining the optimum quality of seeds as per the soil and demographic conditions of the agricultural land.

Genetic improvements and development of plants are done, either through selective breeding or genetic manipulation. When a desirable improvement is achieved, a commercial quantity is developed by planting and harvesting seeds over several generations. The seeds do not have the desired traits are needed to be culled from the population. To speed up the process of bulking up the population, statistical samples of seed are taken and tested to cull seeds from the population that do not adequately express the desired trait.

At present, sampling of seeds involved cutting the seed one by one or crushing the seeds and collecting the pieces for sampling. This process is laborious and time taking. Cutting the seeds by hand leads to contamination of seeds, which degrades the seed sample testing process. Also, the uneven cutting or crushing of seeds leads to wastage because of generation of unwanted particles that are not suitable for sampling.

European Patent Application number EP2409131 provides a system and method for preparing a sample of seeds or representative seed portions are provided. The system and method include a force applying member and a seed container that includes at least one compartment containing a seed. The force applying member is configured to apply a force to the seed to break the seed into two or more seed particles, which in some embodiments may be collected in a seed particle collector.

The above cited prior application provides a system and method for sampling of seeds. However, the system and method involve destructive sampling of seeds, where the application of force on the seeds breaks it into various parts which are not suitable for testing. Further, human intervention leads to contamination of sliced seeds, which greatly reduces the testing process of the sampled seeds.

There is therefore a need to provide a system, device, and method for non-chipping of large number of seeds in a short time for sampling and testing purposes, which provides direct transfer of sliced seeds to prevent contamination sampled seeds while transportation.

OBJECTS OF THE DISCLOSURE

A general object of the present disclosure is to provide a seed slicer device for slicing a plurality of seeds at once.

Another object of the present disclosure is to provide a seed slicer device for slicing a plurality of seeds in a manner that does not harm the viability of the seeds.

Another object of the present disclosure is to provide a seed slicer device that does not require much effort to operate.

Another object of the present disclosure is to provide a seed slicer device that is safe to operate.

Another object of the present disclosure is to provide a seed slicer device that is economical and easy to manufacture.

SUMMARY

The present disclosure relates to the field of seed sampling. More particularly, the present disclosure relates to a device for chipping or slicing a part of a seed for sampling purposes.

In an aspect, the present disclosure provides a seed slicer device, which includes: a first plate having a top portion and a bottom portion, the top portion provided with a plurality of first holes, the plurality of first holes extending towards the bottom portion to form a plurality of first passages; a second plate adapted to fit over the top portion of the first plate, the second plate provided with a plurality of second holes such that, on fitment of the second plate over the first plate, the plurality of second holes overlap with the plurality of first holes; a sliding plate slidably coupled to a top portion of the second plate, the sliding plate operable to selectively cover the plurality of second holes; a third plate adapted to fit over a top portion of the second plate, the third plate provided with a plurality of third holes such that, on fitment of the third plate over the second plate, the plurality of third holes overlap with the plurality of second holes; and a cutting assembly coupled to a top portion of the third plate, the cutting assembly comprising a cutting means adapted to, upon actuation by an actuating means, slide over the plurality of third holes to provide a slicing action. The plurality of seeds are received by the plurality of third holes while the plurality of second holes are covered by the sliding plate such that at least a first part of the plurality of seeds extend beyond the plurality of third holes, and, upon actuation by the actuating means, of the cutting assembly, the plurality of seeds are cut by the cutting means of the cutting assembly to divide the plurality of seeds into corresponding first parts and second parts.

In an embodiment, after the plurality of seeds are cut, the sliding plate can be operated to expose the plurality of second holes to allow the second part of the plurality of seeds to fall subsequently through the plurality of second holes and the plurality of first holes to be collected by the plurality of first passages.

In another embodiment, the sliding plate can be adapted to be actuated to move between a closed position and an open position. The closed position can be defined as the sliding plate covering the plurality of second holes and the open position can be defined as the sliding plate exposing the plurality of second holes.

In another embodiment, the actuating means can be a lever coupled to the cutting assembly, and operation of the lever enables operation of the cutting assembly.

In another embodiment, the cutting assembly can be adapted to, on actuation by the actuating means, to move in an angular direction.

In another embodiment, the cutting means of the cutting assembly, on actuation, can be adapted to eventually cover the plurality of third holes.

In another embodiment, the cutting means can include one or more blades, and the one or more blades can be any or a combination of straight edge blades, hacksaw blades and blades with variable edge configurations.

In another embodiment, components of the seed slicer device can be adapted to be fitted with each other using fastening means selected from any or a combination of screws, nuts and bolts, rivets, adhesives and fastening processes such as welding and brazing.

In another embodiment, the seed slicer device can include a fourth plate adapted to fit over a top portion of the third plate, the fourth plate provided with a plurality of fourth holes such that, on fitment of the fourth plate over the third plate, the plurality of fourth holes can overlap with the plurality of third holes, and wherein the plurality of fourth holes are adapted to receive the plurality of seeds.

In another embodiment, the cutting means and the sliding plate can be adapted to be actuated by automated actuating mechanisms such as motors, pneumatic means, and hydraulic means, operable by a control unit operatively coupled to the actuating mechanisms.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

DETAILED DESCRIPTION

Figure 1:
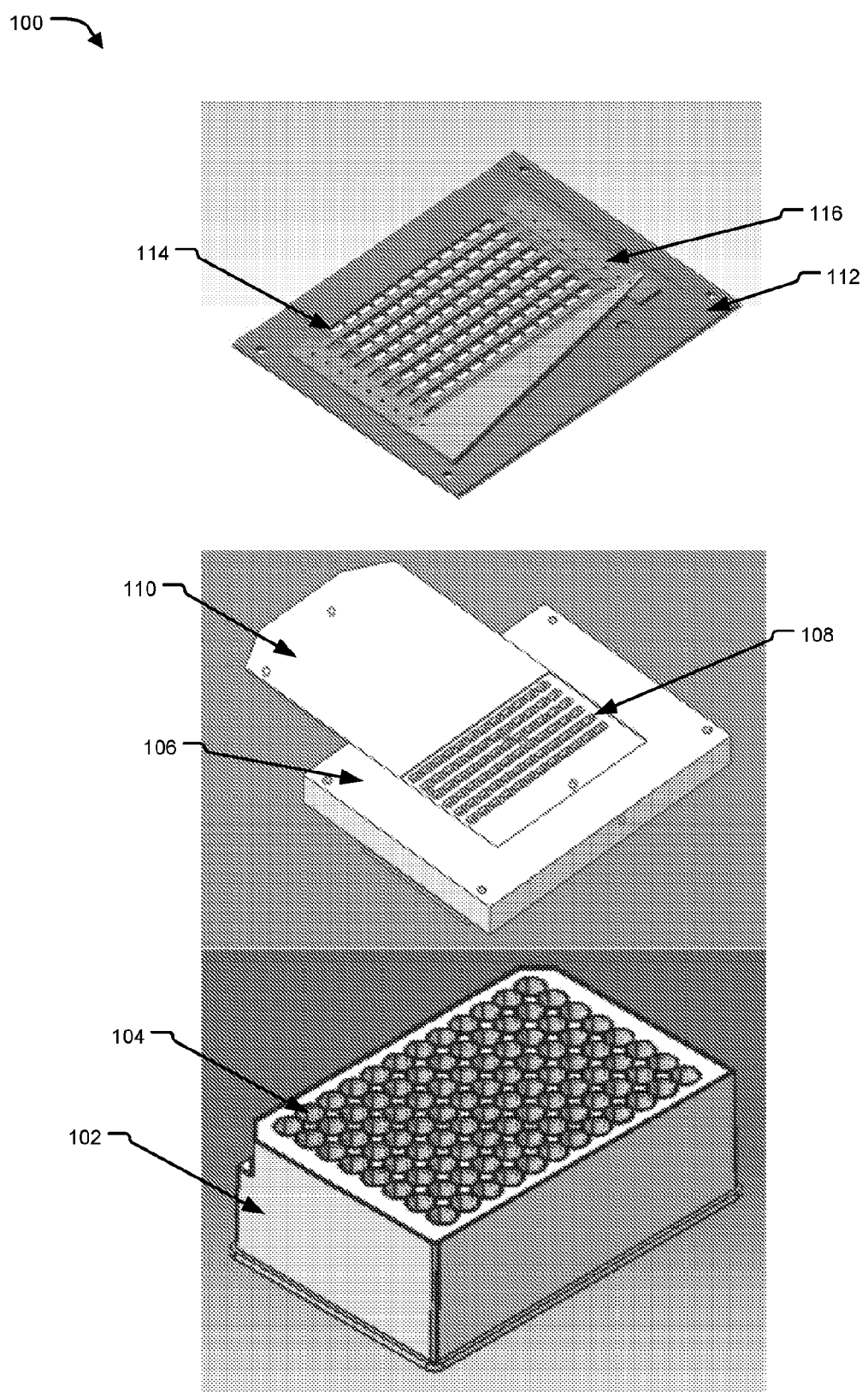
FIG. 1 illustrates a deep well plate, a bottom body, and a bottom plate with a cutting assembly of the proposed device, in accordance with an exemplary embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

The present disclosure relates to the field of seed sampling. More particularly, the present disclosure relates to a device for chipping part of a seed for sampling purposes.

In an aspect, the present disclosure provides a seed slicer device, which includes: a first plate having a top portion and a bottom portion, the top portion provided with a plurality of first holes, the plurality of first holes extending towards the bottom portion to form a plurality of first passages; a second plate adapted to fit over the top portion of the first plate, the second plate provided with a plurality of second holes such that, on fitment of the second plate over the first plate, the plurality of second holes overlap with the plurality of first holes; a sliding plate slidably coupled to a top portion of the second plate, the sliding plate operable to selectively cover the plurality of second holes; a third plate adapted to fit over a top portion of the second plate, the third plate provided with a plurality of third holes such that, on fitment of the third plate over the second plate, the plurality of third holes overlap with the plurality of second holes; and a cutting assembly coupled to a top portion of the third plate, the cutting assembly comprising a cutting means adapted to, upon actuation by an actuating means, slide over the plurality of third holes to provide a slicing action. The plurality of seeds are received by the plurality of third holes while the plurality of second holes are covered by the sliding plate such that at least a first part of the plurality of seeds extend beyond the plurality of third holes, and, upon actuation by the actuating means, of the cutting assembly, the plurality of seeds are cut by the cutting means of the cutting assembly to divide the plurality of seeds into corresponding first parts and second parts.

In an embodiment, after the plurality of seeds are cut, the sliding plate can be operated to expose the plurality of second holes to allow the second part of the plurality of seeds to fall subsequently through the plurality of second holes and the plurality of first holes to be collected by the plurality of first passages.

In another embodiment, the sliding plate can be adapted to be actuated to move between a closed position and an open position. The closed position can be defined as the sliding plate covering the plurality of second holes and the open position can be defined as the sliding plate exposing the plurality of second holes.

In another embodiment, the actuating means can be a lever coupled to the cutting assembly, and operation of the lever enables operation of the cutting assembly.

In another embodiment, the cutting assembly can be adapted to, on actuation by the actuating means, to move in an angular direction.

In another embodiment, the cutting means of the cutting assembly, on actuation, can be adapted to eventually cover the plurality of third holes.

In another embodiment, the cutting means can include one or more blades, and the one or more blades can be any or a combination of straight edge blades, hacksaw blades and blades with variable edge configurations.

In another embodiment, components of the seed slicer device can be adapted to be fitted with each other using fastening means selected from any or a combination of screws, nuts and bolts, rivets, adhesives and fastening processes such as welding and brazing.

In another embodiment, the seed slicer device can include a fourth plate adapted to fit over a top portion of the third plate, the fourth plate provided with a plurality of fourth holes such that, on fitment of the fourth plate over the third plate, the plurality of fourth holes can overlap with the plurality of third holes, and wherein the plurality of fourth holes are adapted to receive the plurality of seeds.

In another embodiment, the cutting means and the sliding plate can be adapted to be actuated by automated actuating mechanisms such as motors, pneumatic means, and hydraulic means, operable by a control unit operatively coupled to the actuating mechanisms.

In an embodiment, the third plate can include two blade holders configured on two opposite sides of the third plate, each of the two blade holders can be configured to hold at least one end of each of the at least one cutting means.

In an embodiment, the at least one cutting means can include a blade or a hacksaw blade, wherein the hacksaw blade can include a plurality of teeth.

In an embodiment, the actuating means can include any or a combination of a spur rack mechanism, a cam roller mechanism, but not limited to the likes. The actuation means can facilitate movement of the at least one cutting means to allow cutting of the plurality of seeds such that the at least one cutting means covers the plurality of third holes to keep upper part of the plurality of seeds in the fourth hole.

In an embodiment, the third plate can include a first groove to mount a lever on the third plate, wherein rotation of the lever can enable movement of the at least one cutting means over each of the plurality of third holes.

In an embodiment, the lever can be mounted on the third plate by means of a first set of ball bearing, and wherein the first set of ball bearing can be configured on an inner side of the first groove of the third plate to provide free rotation of the lever.

In an embodiment, the fourth plate can include a second groove to allow the lever to pass through the fourth plate.

In an embodiment, an inner side of the second groove of the fourth plate can include a second set of ball bearing to provide free rotation of the lever.

In an embodiment, the sliding plate in the first position can hold a lower part of each of the plurality of seeds over the sliding plate.

In an embodiment, the sliding plate in the first position can prevent the lower part of each of the plurality of seeds to fall into a corresponding first hole of the first plate.

In an embodiment, the first plate, the second plate, the third plate, the cutting assembly and the fourth plate can be coupled to one another using one or more fastening means.

In an embodiment, the cutting assembly can be removed by disassembling the fourth plate. The one or more fasteners can be unfastened from the device to enable disassembling of the cutting assembly and each of the plates of the device.

In an embodiment, the one or more fastening means can include any or a combination of a screw, bolt, clamps, studs, clamping studs, but not limited to the likes. In an embodiment, the first plate, second plate, the third plate, and the fourth plate can be machined at pre-defined positions to form a number of holes such that each of the holes of each of the plates are in line with each other. The number of holes can facilitate the one or more fasteners to couple each of the plates together as one device.

In an embodiment, the number of at least one cutting means for the cutting assembly can be selected such that the at least one cutting means moves over each of the plurality of third holes FIG. 1 illustrates a deep well plate, a bottom body, and a bottom plate with a cutting assembly of the proposed device, in accordance with an exemplary embodiment of the present disclosure.

Referring to FIG. 1, in an embodiment, the proposed device (100) for chipping of seeds can include a first plate (102) (also referred to as a deep well plate (102), herein), which can include a plurality of first holes (104) (herein, individually and collectively designated (104)) provided on a top portion of the first plate (102), that extend towards a bottom portion of the first plate (102) to form a corresponding plurality of passages (not shown in figure). Each of the plurality of first holes (104) can be configured to accommodate at least a part of a seed to be cut or sliced.

In an embodiment, the device can include a second plate (106) (also referred to as a bottom body (106), herein), which can be removably coupled to the top portion of the first plate (102). The second plate (106) can include a plurality of second holes (108) (herein, individually and collectively designated (108)) located such that, on coupling of the second plate (106) with the first plate (102), the plurality of second holes (108) overlaps with a corresponding first hole (104). In an embodiment, a sliding plate (110) can be slidably coupled to the second plate (106) such that the sliding plate (110) can move between a first position and a second position. In an exemplary embodiment, the first position corresponds to a closed position wherein the sliding plate (110) can completely cover the plurality of second holes (108). In another exemplary embodiment, the second position corresponds to an open position wherein the sliding plate (110) exposes the plurality of second holes (108).

In an embodiment, a third plate (112) (also referred to as a bottom plate, herein) is removably coupled to a top portion of the second plate (106). The third plate (112) can include a plurality of third holes (114) (herein, individually and collectively designated (114)) located such that, on coupling of the third plate (112) with the second plate (106), the plurality of third holes (114) overlaps with a corresponding second hole (108). In an embodiment, a cutting assembly (116) can be removably coupled to the third plate (112) to enable chipping or cutting of the seeds in two parts.

Figure 3A:
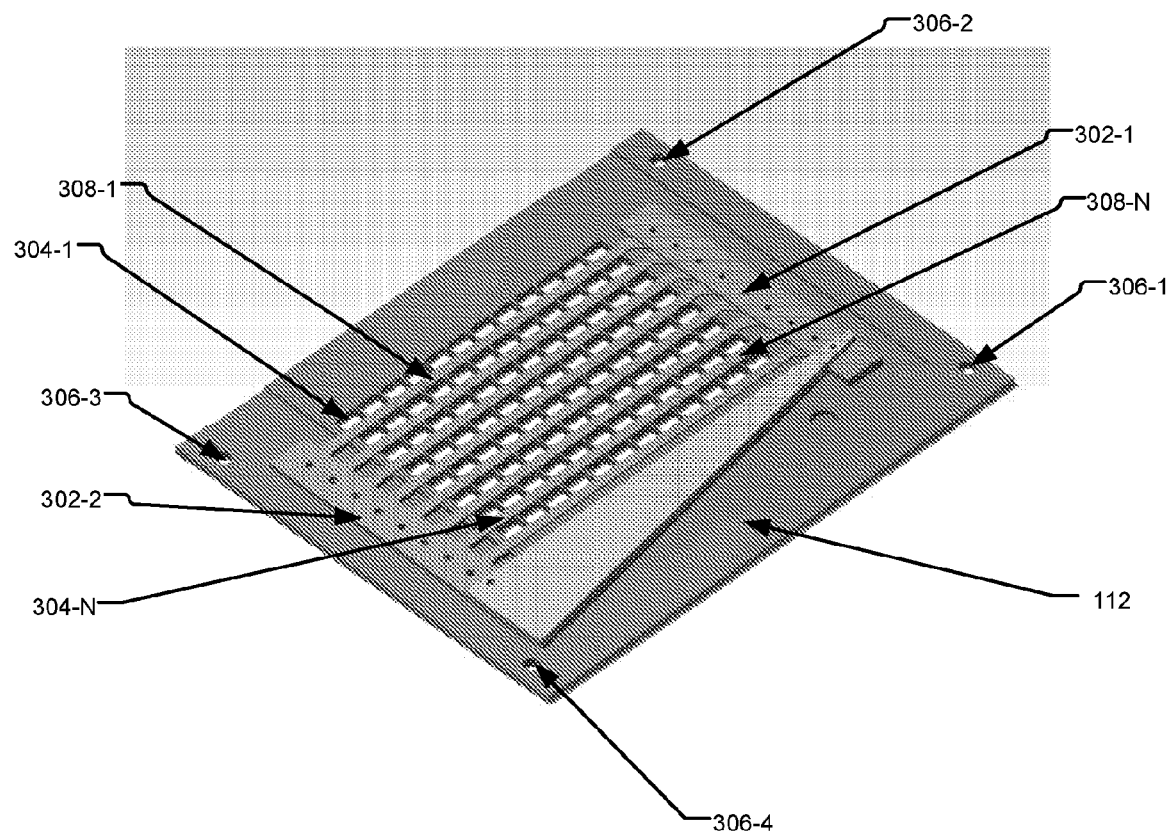
FIG. 3A illustrates detailed view of the cutting assembly of the proposed device, in accordance with an exemplary embodiment of the present disclosure.

In an embodiment, the cutting assembly (116) can include one or more guides adapted to hold one or more blades and to guide the one or more blades along a direction when the one or more blades are actuated, as further elaborated in FIG. 3A.

In an embodiment, the one or more blades are so disposed that, when not actuated, they allow entry of seeds through the plurality of third holes (114). When actuated, the one or more blades pass over the plurality of third holes (114) and cover the plurality of third holes (114).

Figure 2A:
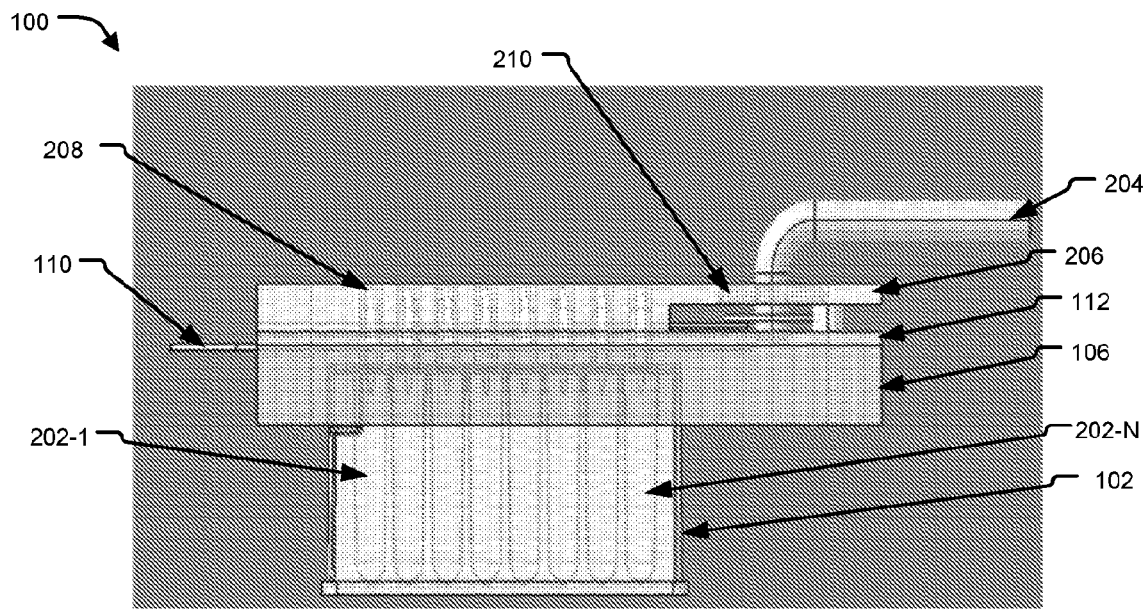
FIG. 2A illustrates a sectional view the proposed device, in accordance with an embodiment of the present disclosure.

FIG. 2A illustrates a sectional view the proposed device, in accordance with an embodiment of the present disclosure.

According to an embodiment, as illustrated in FIG. 2A, the proposed seed slicer device (100) can include the first plate (102) positioned in the lower most part of the device.

The first plate (102) can include the plurality of first holes (104) provided on the top portion of the first plate (102), that extend towards the bottom portion of the first plate (102) to form a corresponding plurality of passages (202) (herein, collectively and individually designate (202)). Each of the plurality of first holes (104) and corresponding first passages (202) are adapted to accommodate at least a part of a seed being sliced or cut by the cutting assembly (116) of the device (100).

In an embodiment, the second plate (106) can be placed on the top portion of the first plate (102). The second plate (106) can include the plurality of second holes (108) overlapping a corresponding first hole of the first plate (102), where the each of the plurality of second holes (108) is adapted to allow passage to the seed being sliced by the cutting assembly (116) such that the cut portion of the seeds can pass through the plurality of second holes (108) to the plurality of first passages (202).

In an embodiment, the sliding plate (110) can be slidably coupled to the second plate (106) such that the sliding plate (110) can move between a first position and a second position. The first position corresponds to a closed position wherein the sliding plate (110) can completely cover the plurality of second holes (108). The second position corresponds to an open position wherein the sliding plate (110) exposes the plurality of second holes (108). The sliding plate (110), in the closed position does not allow entry of the seeds to the plurality of second holes (108), while, in the open position, the plurality of second holes (108) are exposed to receive the seeds.

In an embodiment, the third plate (112) can be removably placed above the sliding plate (110). The third plate (112) can include a plurality of third holes (114) such that each of the plurality of third holes (114) are in line with a corresponding second hole (108) such that the cut portion of the seed being sliced by the cutting assembly (116) of the device (100) can pass through the plurality of second holes (108) to fall into the first passages (202).

In an embodiment, the cutting assembly (116) can be coupled to the third plate (112). The cutting assembly (116) can include at least one cutting means to slice or chip the plurality of seeds into two part. In an embodiment, an actuating means can be operatively coupled to the at least one cutting means to allow movement of the at least one cutting means over each of the plurality of third holes (114) to cut the plurality of seeds.

In an embodiment, the third plate (112) can include a first groove to mount a lever (204) on the third plate (112), wherein rotation of the lever (204) can enable movement of the at least one cutting means over each of the plurality of third holes (114) to cut the plurality of seeds.

In an exemplary embodiment, the cutting means can have a cam profile such that rotation of the lever (204) can cause an angular motion of the cutting means over the plurality of third holes (114).

In an embodiment, the lever (204) can mounted on the third plate (112) by means of a ball bearing, and wherein the ball bearing can be configured on an inner side of the first groove of the third plate (112) to provide free rotation of the lever (204).

In an embodiment, the sliding plate (110) in the first position can hold a lower part of each of the plurality of seeds over the sliding plate (110) after being cut or sliced by the cutting assembly (116).

In an embodiment, the sliding plate (110) in the first position can prevent the lower part of each of the sliced seeds to fall into the plurality of first holes (104) of the first plate (102).

In an embodiment, the device can include a fourth plate (206) (also referred to as a top body, herein) over the third plate (112), which can include a plurality of fourth holes (208) such that each of the plurality of fourth holes (208) are in line with a corresponding third hole of the third plate (112) and the plurality of fourth holes (208) are configured to accommodate the plurality of seeds to be sliced.

In an exemplary embodiment, the fourth plate (206) can include a second groove (208) to allow the lever (204) to pass through the fourth plate (206).

In an exemplary embodiment, an inner side of the second groove of the fourth plate (206) can accommodate at least a part of the ball bearing to provide free rotation of the lever (204).

In an embodiment, the seeds can be placed in the plurality of fourth holes (208) on the fourth plate (206), while the sliding plate (110) is in the closed position. The sliding plate (110) forms a base on which the seeds rest, such that only a portion of the seeds extend beyond the third plate (112). The lever (204) is actuated, and the cutting means is adapted to pass over the plurality of the third holes (114) to cut the seeds to separate them into a first part and a second part, where the first part of the seeds are below the blades and the second part of the seeds are above the blades. The blades now cover the plurality of third holes (114) to form a barrier between the first part and the second part of the plurality of seeds.

In an embodiment, the sliding plate (110) may be moved to the open position, whereupon the first part of the seeds fall through the plurality of second holes (108) into the corresponding plurality of first passages (202).

It may be appreciated that the device (100) may be assembled such that the portion of a seed extending beyond the plurality of third holes (114) may be varied. It may further be appreciated that other design parameters of the device (100) may be modified so as to accommodate different seeds of different varieties, and that all possible modifications thereto are within the scope of the present disclosure.

Figure 2B:
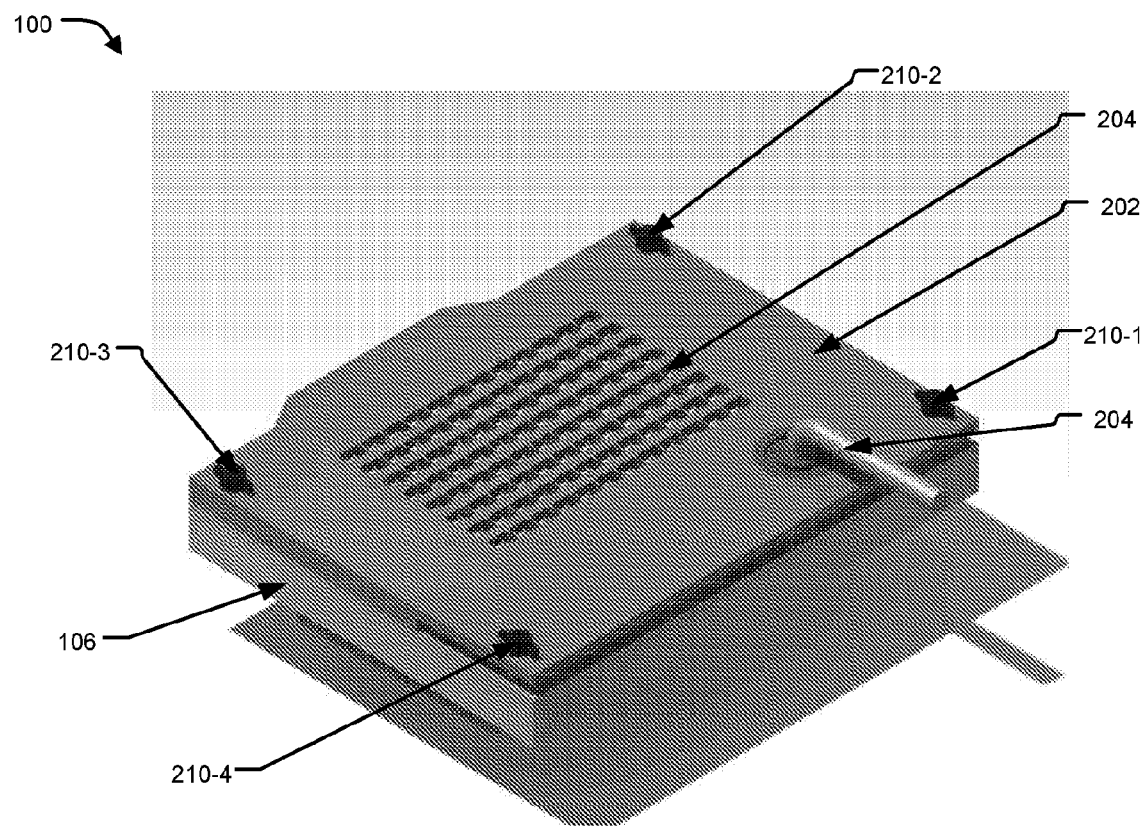
FIG. 2B illustrates a side view of the proposed device, in accordance with an embodiment of the present disclosure.

FIG. 2B illustrates a side view of the proposed device, in accordance with an embodiment of the present disclosure.

Referring to FIG. 2B, in an embodiment, at least one of the first plate (102), second plate (106), third plate (112) and the fourth plate (206) (collectively referred to as the plates, herein) can include a number of holes 306-1, 306-2 . . . 306-N (herein, individually and collectively designated 306; refer FIG. 3A) drilled at pre-defined position on them such that the number of holes (306) on the plates are in line with each other. The number of holes (306) can facilitate one or more fasteners to couple at least two of the plates together. In an implementation, the number of holes (306-1 to 306-4) can be positioned around four corners of the plates.

In an embodiment, the one or more fastening means (210-1 to 210-4) (herein, individually, and collectively designated (210)) can include any or a combination of a screw, bolt, clamps, studs, clamping studs, but not limited to the likes.

In an exemplary embodiment, the one or more fastening means (208) can be made from brass, steel, metals, but not limited to the likes.

In an exemplary embodiment, the fastening means (210) can be any that can be operated without tools.

In an exemplary embodiment, the first plate, the second plate, the third plate, the fourth plate, the sliding plate can be made from polycarbonate, ASA, and ABS thermoplastic, but not limited to the likes. The use of such materials allows for the proposed device (100) to be easy to manufacture and to be economical.

FIG. 3A illustrates detailed view of the cutting assembly of the proposed device, in accordance with an exemplary embodiment of the present disclosure.

Referring to FIG. 3A, the third plate (112) of the proposed device can include the cutting assembly (114) removably coupled to it. In an embodiment, the third plate (112) can include two blade holders (302-1 and 302-2) (herein, individually, and collectively designated (302)) configured on two opposite sides of the third plate (112). In an embodiment, each of the blade holders (302) can be configured to hold at least one end of each of the at least one cutting means.

In an embodiment, the at least one cutting means can include a blade hacksaw, wherein the hacksaw blade can include a plurality of teeth, but not limited to the likes.

In an embodiment, the actuating means can include any or a combination of a spur rack mechanism, a cam roller mechanism, but not limited to the likes. In an exemplary embodiment, the actuation means can facilitate movement of the at least one cutting means to allow cutting of the plurality of seeds such that the at least one cuttings means covers the plurality of third holes (114) to keep upper part of the plurality of seeds above it.

In an implementation, the rotation of the lever (204) can enable the plurality of blades 308-1, 308-2 . . . 308-N (herein, individually and collectively designated (308)) to cut or chip the plurality of seeds such that the at least one cutting means covers the plurality of third holes (114) to keep upper part of the plurality of seeds above the it.

In another implementation, one end of each of the blades (308) can be coupled to blade holder (302-1) and another end of each of the blades (308) can be coupled to blade holder (302-2).

In an embodiment, the actuation means can facilitate movement of the blade holders (302) to allow cutting of the plurality of seeds by the blades (308) such that the blades (308) cover the plurality of third holes (114) to keep upper part of the plurality of seeds above it.

In an embodiment, rotation of the lever (204) can actuate the actuating means to facilitate movement of the blades (308) to allow cutting of the plurality of seeds such that the blades cover the plurality of third holes (114) to keep upper part of the plurality of seeds above the blade. In another embodiment, the movement of the sliding plate (110) from the first position to the second position after cutting the plurality of seeds and rotation of the lever to its original position can allow the blades (308) to return to its original position, thereby facilitating the upper part of the sliced or sliced seed to fall on the sliding tray (110).

In an exemplary embodiment, the blades (114), blade holders (302), the actuating means can be made from metal, plastic, but not limited to the likes.

Figure 3B:
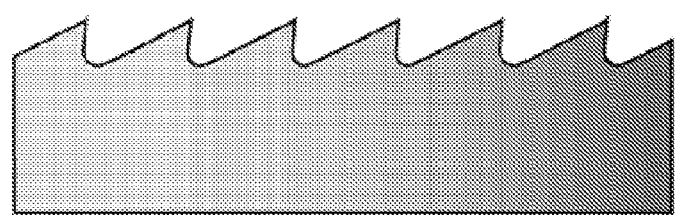
FIG. 3B illustrates an exemplary representation of a blade for the cutting assembly of the proposed device, in accordance with an embodiment of the present disclosure.

FIG. 3B illustrates an exemplary representation of a blade for the cutting assembly, in accordance with an embodiment of the present disclosure. The blade may be a hacksaw blade or any other blade having a serrated cutting edge. The teeth size may be small to accommodate higher numbers of teeth per length of the cutting edge.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Disclosure

The present disclosure provides a seed slicer device for slicing a plurality of seeds at once.

The present disclosure provides a seed slicer device for slicing a plurality of seeds in a manner that does not harm the viability of the seeds.

The present disclosure provides a seed slicer device that does not require much effort to operate.

The present disclosure provides a seed slicer device that is safe to operate.

The present disclosure provides a seed slicer device that is economical and easy to manufacture.

We claim:

1. A seed slicer device, said seed slicer device comprising:
a first plate, that defines a deep well of the seed slicer device, having a top portion and a bottom portion,
the top portion provided with a plurality of first seed-holes,
the plurality of first seed-holes extending towards the bottom portion to form a plurality of first deep well passages;
a second plate, that defines a bottom body of the seed slicer device, adapted to fit over the top portion of the first plate,
the second plate provided with a plurality of second seed-holes,
such that, on fitment of the second plate over the first plate, the plurality of second holes overlap with the plurality of first holes;
a sliding plate, configured without seed-holes to define a seed-tray of the seed slicer device, slidably coupled to a top portion of the second plate,
the sliding plate is adapted to be actuated to move between a closed position and an open position, and
wherein the closed position is defined as the sliding plate covering the plurality of second seed-holes and the open position is defined as the sliding plate exposing the plurality of second seed-holes;
a third plate, that defines a bottom plate of the seed slicer device, adapted to fit over a top portion of the second plate,
the third plate provided with a plurality of third seed-holes,
such that, on fitment of the third plate over the second plate, the plurality of third seed-holes overlap with the plurality of second seed-holes; and
a cutting assembly coupled to a top portion of the third plate,
the cutting assembly comprising a cutting means that includes at least one blade, wherein the cutting means is adapted to, upon actuation by an actuating means, slide over the plurality of third seed-holes to provide a slicing action,
wherein, in operation, while the sliding plate is in the closed position such that the plurality of second seed-holes are covered by the sliding plate:
the plurality of seeds are received by the plurality of third seed-holes, such that at least a first part of the plurality of seeds extend beyond the plurality of third seed-holes,
wherein, upon actuation by the actuating means, of the cutting assembly, the plurality of seeds are cut by the at least one blade of the cutting means of the cutting assembly to divide the plurality of seeds into corresponding first parts and second parts that are respectively lower parts and upper parts of the seeds, wherein the at least one blade of the cutting means covers the plurality of third seed-holes so that the second parts of the plurality of seeds remain above the at least one blade; and moving the sliding plate to the opened position exposes the plurality of second seed-holes to allow the first part of the plurality of seeds to fall through the plurality of second seed-holes and the plurality of first seed-holes to be collected by the plurality of first deep well passages.

2. The seed slicer device as claimed in claim 1, wherein, after the plurality of seeds are cut, the first part of the first seed-holes is collected by the plurality of first deep well passages, the at least one blade of the cutting means is retracted, and the sliding plate is in the opened position, the second part of the plurality of seeds that was supported by the at least one blade is allowed to fall through the plurality of second seed-holes and the plurality of first seed-holes to be collected by the plurality of first deep well passages.

3. The seed slicer device as claimed in claim 2, wherein the actuating means is a lever coupled to the cutting assembly, and
wherein operation of the lever enables operation of the cutting assembly.

4. The seed slicer device as claimed in claim 2, wherein the at least one blades are any or a combination of straight edge blades, hacksaw blades and blades with variable edge configurations.

5. The seed slicer device as claimed in claim 3, wherein the seed slicer device comprises a fourth plate, that defines a top body of the seed slider device, adapted to fit over a top portion of the third plate,
the fourth plate provided with a plurality of fourth seed-holes,
such that, on fitment of the fourth plate over the third plate, the plurality of fourth seed-holes overlap with the plurality of third seed-holes, and
wherein the plurality of fourth seed-holes are adapted to receive the plurality of seeds, and
the each of the first, second, third and fourth plates are stationary during operation of the device.

6. The seed slicer device as claimed in claim 5, wherein one or more of the first, second third and fourth plates of the seed slicer device are adapted to be fitted with each other using fastening means selected from any or a combination of screws, nuts and bolts, rivets, adhesives and fastening processes such as welding and brazing.

7. The seed slicer device of claim 5, wherein the third plate includes blade holders to hold the at least one blade of the cutting means against the third plate so that the at least one blade is movable to cover the plurality of third seed-holes and cut the seeds.

8. The seed slicer device of claim 7, wherein rotation of the lever moves the at least one blade of the cutting means to cover each of the plurality of third seed-holes to cut the plurality of seeds.

9. The seed slicer device of claim 8, wherein the third plate includes a first groove to mount the lever to the third plate, and
the fourth plate includes a second groove to allow the lever to pass through the fourth plate.

10. The seed slicer device of claim 9, wherein the lever is mounted to the third plate via one or more bearings to provide for rotation of the lever relative to the third plate, and
the second groove is configured to seat at least part of the one or more bearings to provide for rotation of the lever relative to the fourth plate.

11. The seed slicer device of claim 8, wherein the lever is a handle.

12. The seed slicer device as claimed in claim 1, wherein the at least one blade of the cutting assembly has, end-to-end, an angular cutting edge.

13. The seed slicer device as claimed in claim 1, wherein the cutting means and the sliding plate are adapted to be actuated by automated actuating mechanisms.

14. The seed slicer device of claim 13, wherein the automated actuating mechanisms include one or more of motors, pneumatic means and hydraulic means, operable by a control unit operatively coupled to the actuating mechanisms.

* * * * *